(12) United States Patent
Guenther et al.

(10) Patent No.: US 7,893,181 B2
(45) Date of Patent: Feb. 22, 2011

(54) BIMODAL FILM RESIN AND PRODUCTS MADE THEREFROM

(75) Inventors: Gerhard Guenther, Seabrook, TX (US); Curtis D. Clark, League City, TX (US)

(73) Assignee: Fina Technology, Inc., Houston, TX (US)

( * ) Notice: Subject to any disclaimer, the term of this patent is extended or adjusted under 35 U.S.C. 154(b) by 453 days.

(21) Appl. No.: 11/774,289

(22) Filed: Jul. 6, 2007

(65) Prior Publication Data
US 2008/0014425 A1 Jan. 17, 2008

Related U.S. Application Data

(60) Provisional application No. 60/830,016, filed on Jul. 11, 2006.

(51) Int. Cl.
*C08F 10/02* (2006.01)

(52) U.S. Cl. ............... 526/348.1; 526/352; 526/124.2; 526/124.3

(58) Field of Classification Search .............. 526/348.1, 526/352, 124.2, 124.3
See application file for complete search history.

(56) References Cited

U.S. PATENT DOCUMENTS

| | | | |
|---|---|---|---|
| 4,255,544 A | 3/1981 | Kimura et al. |
| 4,271,060 A | 6/1981 | Hubby |
| 4,543,399 A | 9/1985 | Jenkins et al. |
| 4,588,790 A | 5/1986 | Jenkins et al. |
| 5,001,205 A | 3/1991 | Hoel |
| 5,028,670 A | 7/1991 | Chinh et al. |
| 5,236,998 A | 8/1993 | Lundeen |
| 5,284,613 A | 2/1994 | Ali et al. |
| 5,317,036 A | 5/1994 | Brady et al. |
| 5,352,749 A | 10/1994 | DeChellis et al. |
| 5,405,922 A | 4/1995 | DeChellis et al. |
| 5,436,304 A | 7/1995 | Griffin et al. |
| 5,456,471 A | 10/1995 | MacDonald |
| 5,462,999 A | 10/1995 | Griffin et al. |
| 5,525,678 A | 6/1996 | Mink et al. |
| 5,589,555 A | 12/1996 | Zboril et al. |
| 5,616,661 A | 4/1997 | Eisinger et al. |
| 5,627,242 A | 5/1997 | Jacobsen et al. |
| 5,665,818 A | 9/1997 | Tilston et al. |
| 5,668,228 A | 9/1997 | Chinh et al. |
| 5,677,375 A | 10/1997 | Rifi et al. |
| 6,147,173 A | 11/2000 | Holtcamp |
| 6,174,971 B1 | 1/2001 | Chen et al. |
| 6,180,735 B1 | 1/2001 | Wenzel |
| 6,207,606 B1 | 3/2001 | Lue et al. |
| 6,211,105 B1 | 4/2001 | Holtcamp |
| 6,242,545 B1 | 6/2001 | Jejelowo et al. |
| 6,245,705 B1 | 6/2001 | Kissin |
| 6,245,868 B1 | 6/2001 | Agapiou et al. |
| 6,248,845 B1 | 6/2001 | Loveday et al. |
| 6,271,323 B1 | 8/2001 | Loveday et al. |
| 6,274,684 B1 | 8/2001 | Loveday et al. |
| 6,300,436 B1 | 10/2001 | Agapiou et al. |
| 6,339,134 B1 | 1/2002 | Crowther et al. |
| 6,340,730 B1 | 1/2002 | Murray et al. |
| 6,346,586 B1 | 2/2002 | Agapiou et al. |
| 6,359,072 B1 | 3/2002 | Whaley |
| 6,380,328 B1 | 4/2002 | McConville et al. |
| 6,420,580 B1 | 7/2002 | Holtcamp |
| 6,734,134 B1 | 5/2004 | Gray et al. |
| 6,989,423 B2 | 1/2006 | Wagner et al. |
| 2006/0025545 A1 | 2/2006 | Brant et al. |
| 2008/0004411 A1 * | 1/2008 | Sukhadia et al. ......... 526/348.1 |

OTHER PUBLICATIONS

Kirk-Othmer, Encyclopedia of Chemical Technology, vol. 17, 4th Edition, pp. 735-737 (1996).
Borealis, "Blow Film for Heavy Duty Sacks—Borstar Bimodal Film Combines High Impact and Seal Strength to Reduce Risks of Breakage", Industry Solutions (2007).
Equistar, a Lyondell Chemical Company, Alathon L5906 High Density Polyethylene HMW Film Grade.

* cited by examiner

*Primary Examiner*—Ling-Siu Choi
(74) *Attorney, Agent, or Firm*—Tenley R. Krueger

(57) ABSTRACT

A polymer, and a process of producing the polymer, that comprises at least one olefin and has a density of 0.955 g/cc to 0.959 g/cc and a secant modulus 140,000 psi to 220,000 psi. A film that comprises the polymer, that has a thickness of 0.5 mil to 10 mil, a drop dart impact of 10 g to 200 g, a tear strength of 10 to 1200 g and a secant modulus of 140,000 psi to 220,000 psi.

8 Claims, No Drawings

BIMODAL FILM RESIN AND PRODUCTS MADE THEREFROM

PRIORITY CLAIM AND CROSS-REFERENCE TO RELATED APPLICATIONS

This Application claims the benefit of U.S. Provisional Patent Application No. 60/830,016, filed Jul. 11, 2006.

FIELD

Embodiments of the present invention relate generally to polymeric resins and to end-use products made from such polymeric resins. More particularly, the present invention relates to bimodal polyolefins made from Ziegler-Natta catalysts having certain desirable physical properties and the end-use products having certain desirable physical properties, derived from such bimodal polyolefins.

BACKGROUND

Polyethylene has been used in the production of various film products, such as bags and packaging. Examples of such products include shipping sack applications, fertilizer bags, insulation bags, etc.

Biaxially-oriented, blown polyolefin films are generally known in the art and have been used in the production of articles such as garbage bags, shopping bags, food wraps, and any number of articles requiring polymer chain orientation in both the machine direction (MD) and the transverse direction (TD) of the film. Although cast films may be processed to achieve biaxial-orientation, blown films are generally preferred as they usually required less subsequent processing steps to achieve good mechanical properties, namely tensile strength, elastic modulus, and impact resistance, in both the machine and transverse directions. Tailoring the properties of the polyolefins, such as polyethylene, to fit a desired applicability is constantly ongoing.

Achieving outstanding stiffness, which can allow for downgauge of the film, while maintaining excellent toughness, is desired. Having a resin that provides for lower extrusion pressure and better mixing with other resins, such as metallocene MDPE, metallocene LLDPE, LDPE, or LLDPE in monolayer or coextruded film applications, is also desirable.

SUMMARY

In one embodiment, the present invention includes a polymer comprising at least one olefin and having a density of 0.953 g/cc to 0.960 g/cc and a secant modulus 140,000 psi to 220,000 psi.

In one embodiment, the present invention includes a process for producing a polymer, said process comprising: (a) contacting one or more olefin monomers together in the presence of a catalyst under polymerization conditions, wherein said catalyst is produced by a process comprising: (i) contacting an alkyl magnesium compound with an alcohol to form a magnesium dialkoxide compound; (ii) contacting said magnesium dialkoxide compound with a first agent to form a reaction product "A"; (iii) contacting said reaction product "A" with a second agent to form reaction product "B"; (iv) contacting said reaction product "B" with a third agent to form reaction product "C"; (v) contacting said reaction product "C" with a fourth agent to form reaction product "D"; and (vi) contacting said reaction product "D" with a fifth agent to form said catalyst; and (b) extracting said polymer.

In one embodiment, the present invention includes a film comprising a polymer, said film having a thickness of 0.5 mil to 10 mil, a drop dart impact of 10 g to 200 g, a tear strength of 10 to 1200 g and a secant modulus of 140,000 psi to 220,000 psi.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" refers to the weight of product produced per weight of the catalyst used in a process per hour of reaction at a standard set of conditions (e.g., grams product/gram catalyst/hr).

The term "substituted" refers to an atom, radical or group that replaces a hydrogen in a chemical compound.

The term "blend" refers to a mixture of compounds that are blended and/or mixed prior to contact with another compound.

As used herein, "density" is measured via ASTM-D-792.

As used herein, "melt flow index" is measured via ASTM-D-1238-01 (Method A—Cut and Weigh).

As used herein, "secant modulus" is measured via ASTM-D882, and may be referred to as "stiffness".

The term "equivalent" refers to a molar ratio of two components.

As used herein, "molecular weight distribution" is the ratio of the weight average molecular weight to the number average molecular weight (Mw/Mn) of a polymer.

As used herein, "room temperature" includes a temperature of from about 20° C. to about 28° C. (68° F. to 82° F.) However, room temperature measurements generally do not include close monitoring of the temperature of the process and therefore such a recitation does not intend to bind the embodiments described herein to any predetermined temperature range. Furthermore, a temperature difference of a few degrees does not matter to the phenomenon under investigation, such as a preparation method.

As used herein, "bimodal" refers to a polymerization process for producing a bimodal resin having a distinct low molecular weight portion and a distinct high molecular weight portion.

As used herein, "copolymer" refers to any polymeric material comprising two or more different monomers.

As used herein, "dart drop impact" refers to the weight required to cause 50% of tested films to fail by impact from a falling dart under specified test conditions, and is measured using ASTM-D1709.

As used herein, "tensile properties of film" include elongation at break, which is tensile elongation corresponding to the point of rupture; elongation at yield, which is tensile elongation corresponding to the point of yield; tensile strength at break, which is the tensile stress corresponding to the point of rupture; tensile strength at yield, which is the tensile stress corresponding to the point of yield; and secant modulus, which is the ratio of stress to strain defined by the slope of a line from the origin to a point on the stress-strain curve as defined in using ASTM-D882.

As used herein, "Elmendorf tear strength" refers to the average force required to propagate tearing through a specified length of plastic film or nonrigid sheeting on an Elmendorf-type tear tester, and was measured using ASTM D1922.

Ziegler-Natta catalyst systems are generally formed from the combination of a metal component (e.g., a catalyst precursor) with one or more additional components, such as a catalyst support, a cocatalyst and/or one or more electron donors, for example.

A specific example of a Ziegler-Natta catalyst includes a metal component generally represented by the formula:

$$MR^4_x;$$

wherein M is a transition metal, $R^4$ is a halogen, an alkoxy or a hydrocarboxyl group and x is the valence of the transition metal. For example, x may be from 1 to 4.

The transition metal may be selected from Groups IV through VIB (e.g., titanium, vanadium or chromium), for example. $R^4$ may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as trimethyl aluminum (TMA), triethyl aluminum (TEAl), tri-n-octylaluminum (TNOAl), and triisobutyl aluminum (TIBAl), for example.

The components of the Ziegler-Natta catalyst system (e.g., catalyst, activator and/or electron donors) may or may not be associated with a support, either in combination with each other or separate from one another. The Ziegler-Natta support materials may include a magnesium dihalide, such as magnesium dichloride or magnesium dibromide, or silica, for example.

Prior efforts to form the Ziegler-Natta catalyst generally included the methods described below. (See, U.S. Pat. No. 6,734,134 and U.S. Pat. No. 6,174,971, which are incorporated by reference herein.)

A representative, non-limiting, illustration of a possible reaction scheme may be illustrated as follows:

1) $MgR^1R^2 + 2\ R^3OH \rightarrow Mg(OR^3)_2$

2) $Mg(OR^3)_2 + ClA(O_xR^4)_y \rightarrow \text{"A"}$

3) $\text{"A"} + TiCl_4/Ti(OR^5)_4 \rightarrow \text{"B"}$

4) $\text{"B"} + TiCl_4 \rightarrow \text{"C"}$

5) $\text{"C"} + TiCl_4 \rightarrow \text{"D"}$

6) $\text{"D"} + AR^6_3 \rightarrow \text{Catalyst}$

Note that while the primary reaction components are illustrated above, additional components may be reaction products or used in such reactions and not illustrated above. Further, while described herein in terms of primary reaction steps, it is known to those skilled in the art that additional steps may be included in the reaction schemes and processes described herein (e.g., washing, filtering, drying or decanting steps), while it is further contemplated that other steps may be eliminated in certain embodiments. In addition, it is contemplated that any of the agents described herein may be added in combination with one another so long as the order of addition complies with the spirit of the invention. For example, the third and fourth agents may be added to reaction product B at the same time to form reaction product D.

Such methods generally include contacting an alkyl magnesium compound with an alcohol to form a magnesium dialkoxide compound. Such reaction may occur at a reaction temperature ranging from room temperature to about 90° C. for a time of up to about 10 hours, for example.

The alcohol may be added to the alkyl magnesium compound in an equivalent of from about 0.5 to about 6 or from about 1 to about 3, for example.

The alkyl magnesium compound may be represented by the following formula:

$$MgR^1R^2;$$

wherein $R^1$ and $R^2$ are independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example.

The alcohol may be represented by the formula:

$$R^3OH;$$

wherein $R^3$ is selected from $C_2$ to $C_{20}$ alkyl groups. Non-limiting illustrations of alcohols generally include butanol, isobutanol and 2-ethylhexanol, for example.

The method then includes contacting the magnesium dialkoxide compound with a first agent, or halogenating agent, to form reaction product "A".

Such reaction may occur in the presence of an inert solvent. A variety of hydrocarbons can be used as the inert solvent, but any hydrocarbon selected should remain in liquid form at all relevant reaction temperatures and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The reaction may further occur at a temperature of from about 0° C. to about 100° C. or from about 20° C. to about 90° C. for a time of from about 0.2 hours to about 24 hours or from about 1 hour to about 4 hours, for example.

Non-limiting examples of the first agent are generally represented by the following formula:

$$ClA(O_xR^4)_y;$$

wherein A is selected from titanium, silicon, aluminum, carbon, tin and germanium, $R^4$ is selected from $C_1$ to $C_{10}$ alkyls, such as methyl, ethyl, propyl and isopropyl, x is 0 or 1 and y is the valence of A minus 1. Non-limiting illustrations of first agents include chlorotitaniumtriisopropoxide (ClTi(O$^i$Pr)$_3$) and ClSi(Me)$_3$, for example.

The method then includes contacting reaction product "A" with a second agent, or halogenating/titanating agent to form reaction product "B".

Such reaction may occur in the presence of an inert solvent. The inert solvents may include any of those solvents previously discussed herein, for example.

The reaction may further occur at a temperature of from about 0° C. to about 100° C. or from about 20° C. to about 90° C. for a time of from about 0.2 hours to about 36 hours or from about 1 hour to about 4 hours, for example.

The second agent may be added to reaction product "A" in an equivalent of from about 0.5 to about 5, or from about 1 to about 4 or from about 1.5 to about 2.5, for example.

The second agent may be represented by the following formula:

$$TiCl_4/Ti(OR^5)_4;$$

wherein $R^5$ is selected from $C_2$ to $C_{20}$ alkyl groups. Non-limiting illustrations of second agents include blends of titanium chloride and titanium alkoxides, such as TiCl$_4$/Ti(OBu)$_4$. The blends may have an equivalent of TiCl$_4$:Ti(OR$^5$)$_4$ of from about 0.5 to about 6 or from about 2 to about 3, for example.

The method may then include contacting reaction product "B" with a third agent, or halogenating/titanating agent to form reaction product "C".

Such reaction may occur in the presence of an inert solvent. The inert solvents may include any of those solvents previously discussed herein, for example.

The reaction may further occur at room temperature, for example.

The third agent may be added to the reaction product "B" in an equivalent of from about 0.1 to about 5, or from about 0.25 to about 4 or from about 0.45 to about 4.5, for example.

Non-limiting illustrations of third agents include metal halides. The metal halides may include any metal halide known to one skilled in the art, such as titanium tetrachloride (TiCl$_4$), for example. The third agent may be added in a equivalent of from about 0.1 to about 5, or from about 0.25 to about 4 or from about 0.45 to about 4.5, for example.

The method may further include contacting reaction product "C" with a fourth agent, or halogenating/titanating agent, to form reaction product "D".

Such reaction may occur in the presence of an inert solvent. The inert solvents may include any of those solvents previously discussed herein, for example.

The reaction may further occur at room temperature, for example.

The fourth agent may be added to the reaction product "C" in an equivalent of from about 0.1 to about 5, or from about 0.25 to about 4 or from about 0.45 to about 4.5, for example.

Non-limiting illustrations of fourth agents include metal halides. The metal halides may include any metal halide previously described herein.

The method may then include contacting reaction product "D" with a fifth agent to form the catalyst component.

The fifth agent may be added to the reaction product "D" in an equivalent of from about 0.1 to about 2 or from 0.5 to about 1.2, for example.

Non-limiting illustrations of fifth agents include organoaluminum compounds. The organoaluminum compounds may include aluminum alkyls having the following formula:

$$AlR^6_3;$$

wherein R is a $C_1$ to $C_{10}$ alkyl compound. Non-limiting illustrations of the aluminum alkyl compounds generally include trimethyl aluminum (TMA), triisobutyl aluminum (TIBAl), triethyl aluminum (TEAl), tri-n-octylaluminum (TNOAl), n-octyl aluminum and n-hexyl aluminum, for example.

As illustrated above, the first agent and the second agent generally include blends of compounds. In addition, the a plurality of first agents or second agents may be used and still retain one or more of the beneficial properties obtained via blends. Further, a magnesium metal may be used in place of the alkyl magnesium compounds. (See for example U.S. patent application Ser. No. 11/474,145, filed 23 Jun., 2006, entitled Formation of Ziegler-Natta Catalyst, which is fully incorporated by reference herein).

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst and optionally a co-catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In one embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

In one embodiment, a slurry process using continuous stirred tank reactors, such as the Hoechst process (see Kirk-Othmer, Encyclopedia of Chemical Technology, Volume 17, $4^{th}$ Edition, pages 735-737 (1996), which is herein incorporated by reference), may be carried out. Hexane is used as the diluent. The reactors may be operated at 75° C. to 95° C. and a total pressure of 1 atm to 12.5 atm. Ethylene comonomer, solvent, catalyst components, and hydrogen are continuously fed into the reactor. Residence time of the catalyst is from 1 to 6 hours. Optionally, hydrogen may be added to the process, such as for molecular weight control of the resultant polymer. Optionally, other monomers, such as butene, may also be added to the process.

In one embodiment, ethylene is polymerized in the presence of a Ziegler-Natta catalyst at elevated temperature and pressure. Polymerization is carried out in a series of polymerization reactors selected from the group of slurry reactors. In one embodiment, the reactor system comprises two continuously stirred tank reactors (CSTR). The reactor system can comprise the reactors in any number and order, and it is also possible to conduct the process in single or multiple loop reactors.

Additionally, there may be included with the polymerization reactors, prereactors, which include any reactor for prepolymerizing the catalyst and for modifying the olefinic feed, if necessary. All reactors may be arranged in series.

The high molecular weight portion and the low or medium molecular weight portion of the resulting bimodal polymer, can be prepared in any order in the reactors, i.e., the low molecular weight portion in the first reactor and the high molecular weight portion in the second reactor, or vise versa. The conditions of the reactor are selected such that 30 wt % to 70 wt %, or 40 wt % to 60 wt %, or 50 wt % of the final product is made in one reactor, with the remaining product being formed in the second reactor.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, bimodal polyethylenes, and polyethylene copolymers for example.

In one embodiment, ethylene based polymers may have a density of from about 0.945 g/cc to about 0.962 g/cc, or from about 0.955 g/cc to about 0.960 g/cc, or from about 0.957 g/cc to about 0.959 g/cc, for example.

Such ethylene based polymers may have a molecular weight distribution of at least 20 or at least 15 or at least 10, for example.

In one embodiment, the ethylene based polymers may have a secant modulus in the MD direction, of 160,000 psi; 140,000 psi; or 140,000 psi; for example. In one embodiment, the ethylene based polymers may have a secant modulus in the TD direction, of 220,000 psi; 200,000 psi; 190,000 psi; or 180,000 psi; for example. The secant modulus in both MD and TD were based on a 1.0 mil blown film extruded at a blow-up ratio (BUR) of 2.5:1.

In one embodiment, the ethylene based polymers may have a melt flow index (MFI) of from about 0.1 dg/min to about 1.0 dg/min., or from about 0.25 dg/min. to about 0.75 dg/min., or from about 0.40 dg/min. to about 0.50 dg/min., for example.

In one embodiment, the ethylene based polymers may have a melt index ratio 121 of at least from 50 to 120, at least from 60 to 90, or at least from 70 to 80, for example.

In one embodiment, the ethylene based polymers may have a tensile strength at yield in the MD direction, based on ASTM-D882, of about 3000 to about 5000 psi, or about 3500 to about 4000 psi. In one embodiment, the ethylene based polymers may have a tensile strength at yield in the TD direction, based on ASTM-D882, of about 2000 to about 4000 psi, or about 2500 to about 3000 psi. The tensile strength at yield in both MD and TD were based on a 1.0 mil blown film extruded at a blow-up ratio (BUR) of 2.5:1.

In one embodiment, the ethylene based polymers may have an elongation at break in the MD direction, based on ASTM-D882, of about 200% to about 500%, or about 200% to about 400%, or about 300% to about 400%. In one embodiment, the ethylene based polymers may have an elongation at break in the TD direction, based on ASTM-D882, of about 5% to about 100%, or about 10% to about 50%, or about 20% to about 50%. The elongation at break in both MD and TD were based on a 1.0 mil blown film extruded at a blow-up ratio (BUR) of 2.5:1.

In one embodiment, the ethylene based polymers may have a tear strength in the MD direction, based on ASTM-D1922, of about 10 grams to about 30 grams, or about 15 grams to about 20 grams. In one embodiment, the ethylene based polymers may have a tear strength in the TD direction, based on ASTM-D1922, of about 1000 grams to about 1500 grams, or about 1100 grams to about 1200 grams. The tear strength in both MD and TD were based on a 1.0 mil blown film extruded at a blow-up ratio (BUR) of 2.5:1.

In one embodiment, the ethylene based polymers may have a drop dart impact strength, based on ASTM-D1709, of about 10 grams to about 200 grams, or about 30 grams to about 150 grams.

Product Application

The polymers and blends thereof are useful in applications known to one skilled in the art, such as forming operations (e.g., film, sheet, pipe and fiber extrusion and co-extrusion as well as blow molding, injection molding and rotational molding). Films include blown or cast films formed by co-extrusion or by lamination useful as shrink film, cling film, stretch film, sealing films, oriented films, snack packaging, heavy duty bags, heavy duty shipping sacks, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, industrial parts, such as, but not limited to, carry cases for hardware (e.g. saws, tools, etc.) and stadium seating, industrial containers, such as, but not limited to, jerry cans for agriculture chemicals, photochemicals, and institutional food products (e.g. oils, ketchup, etc.), and consumer containers, such as, but not limited to, detergent bottles (handleware and non-handleware), personal care bottles (shampoo, cosmetics, etc.), and skin care bottles, for example.

The polymers produced may be extruded on an Extrusion Blown Film Line available from Alpine, Reifenhauser, Kiefel, Macchi, W & H, et al., at typical commercial processing conditions (from 380 F to 420 F, for example).

In one embodiment, the blown film articles may have a thickness greater than 10 mil, or about 0.5 mil to about 10 mil, or about 1 mil to about 8 mil, or about 2 mil to about 6 mil, or about 3 mil to about 4 mil, for example.

In one embodiment, the film may be formed into an article that is coextruded. The coextruded article may comprise a metallocene MDPE, metallocene LLDPE, LLDPE, or combinations thereof. The article may further comprise a blend of a metallocene MDPE, metallocene LLDPE, LLDPE, LDPE or combinations thereof.

EXAMPLES

The invention having been generally described, the following examples are provided merely to illustrate certain embodiments of the invention, and to demonstrate the practice and advantages thereof. It is understood that the examples are given by way of illustration and are not intended to limit the scope of the specification or the claims in any manner.

Certain Test Methods were used in determining the physical properties of the resin and the end-use products. Those Test Methods are listed below and are readily available to those of ordinary skill in the art.

Tests run on the resin included melt index using ASTM D1238 (A) and density using ASTM D792.

Tests run on end-use products included Tensile Properties of Film, determined using ASTM-D882, Dart Drop Impact, determined using ASTM-D1709, and Elmendorf Tear Strength using ASTM D1922.

In the following examples, the Ziegler-Natta catalyst compounds were prepared in a 500 mL reactor equipped with four Morten's indentions and a dropping funnel, three-blade agitator and septa.

As used herein, "BEM" refers to 20.2 wt. % solution of butylethylmagnesium (0.12 wt. % Al).

As used herein, "EHOH" refers to 2-ethylhexanol.

As used herein, "TNBT" refers to tetra n-butyl titanate.

As used herein, "TEAl" refers to triethyl aluminum.

The preparation of the catalyst was achieved by slurrying 100 mmol (54.7 g) of BEM in hexane (total volume 100 ml) and stirring (250 rpm) the mixture at room temperature. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included adding 100 mmol (45 g) of $ClTi(O^iPr)_3$ (2M in hexane) to the mixture at room temperature over 30 minutes. A clear, solid free solution (reaction mixture "A") was obtained. The reaction mixture "A" was then stirred at room temperature for another hour.

In addition, 100 mmol (34.4 g) of TNBT were added to a 250 mL graduated cylinder. 200 mmol (37.04 g) of $TiCl_4$ was then added dropwise to the TNBT mixture at room temperature over 30 minutes to form $2TiCl_4/(OBu)_4$. Hexane was then added to the mixture to provide a mixture volume of 250 mL. The resulting mixture was then allowed to set over 2 hours.

The preparation then included adding the $2TiCl_4/Ti(OBu)_4$ dropwise to the reaction mixture "A" at room temperature over 2 hours to form reaction mixture "B". The reaction mixture "B" was then stirred at room temperature for another hour. The reaction mixture "B" was then decanted and the resulting solids were washed three times with 200 mL of hexane. The solids were then suspended in 200 mL of hexane.

The preparation then included adding 100 mmol (19.0 g) of $TiCl_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed with 200 mL of hexane. The solids were then suspended in 200 mL of hexane.

The preparation then included adding 100 mmol (19.0 g) of $TiCl_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the catalyst composition.

The catalyst composition was then stirred at room temperature for another hour. The catalyst composition was then decanted and dried, resulting in a yield of about 12 g. A person of ordinary skill in the art can adequately scale the catalyst preparation for any process. The catalyst was then diluted to an appropriate concentration for continuous feeding to maintain a desired production rate.

A plant having two CSTRs in series was operated as follows: the first reactor was operated at 186° F. (85° C.) and 125 psig (8.6 bar). Ethylene, hydrogen, and hexane were continuously introduced into the reactor, together with the polymerization catalyst ($5.5 \times 10^{-3}$ wt % based on hexane) and cocatalyst (TNOAl) ($1.1 \times 10^{-1}$ wt % based on hexane). Reactor conditions were such that polymer having properties according to Table 1 was produced. The polymer was introduced into the second reactor, operated at 178° F. (81° C.) and 63 psig (4.3 bar). Additional ethylene was added, along with butene comonomer. Reactor conditions and polymer withdrawal rate were such that materials according to Table 1 were obtained. The reactor conditions in both reactors were such that 51.3% conversion of ethylene was obtained in the first reactor, 48.7% conversion of ethylene was obtained in the second reactor, and an $MI_5$ of 400 dg/min was obtained in the first reactor. $MI_2$ is for 2.16 kg weight used in test and $MI_5$ is for 5 kg weight used in test. These properties were determined using the standard ASTM melt index tests.

Table 1 contains the production conditions and product properties of the resultant polymer.

TABLE 1

Production Conditions and Product Properties

| Condition/Property | Example 1 |
|---|---|
| Reactor One Temperature (° F.) | 186 |
| Reactor One Pressure (psig) | 125 |
| Reactor One $MI_5$ (dg/min) | 446 |
| Reactor Two Temperature (° F.) | 178 |
| Reactor Two Pressure (psig) | 63 |
| Reactor Two $MI_2$ (dg/min) | 0.83 |
| Pellet $MI_2$ (dg/min) | 0.44 |
| Butene (lbs butene/lbs $C_2$) | 0.023 |
| Powder Density (g/cc) | 0.955 |
| Pellet Density (g/cc) | 0.956 |

The polymers produced were extruded on an Extrusion Blown Film Line available from Alpine, Reifenhauser, Kiefel, Macchi, W & H, et al., at typical commercial processing conditions (from 380 F to 420 F, for example). The films were 1.0 mil blown films extruded at a blow-up ratio (BUR) of 2.5:1. These products were tested for drop dart impact, Tear Strength, and Tensile Properties. Table 2 contains these properties.

TABLE 2

Film Properties

| Drop dart impact (grams) | | Tensile Strength (psi) | Elongation at Break (%) | Secant Modulus (psi) | Tear Strength (grams) |
|---|---|---|---|---|---|
| 40 | Machine Direction (MD) | 4540 | 270 | 152400 | 15 |
| | Transverse Direction (TD) | 2600 | 20 | 198700 | 1050 |
| 35 | Machine Direction (MD) | 4800 | 300 | 157500 | 12 |
| | Transverse Direction (TD) | 2600 | 10 | 183300 | 1080 |

While the foregoing is directed to embodiments of the present invention, other and further embodiments of the invention may be devised without departing from the basic scope thereof and the scope thereof is determined by the claims that follow.

What is claimed is:

1. A film comprising a polymer produced by a process comprising: (A) contacting one or more olefin monomers together in the presence of a catalyst under polymerization conditions, wherein said catalyst is produced by a process comprising: (i) contacting an alkyl magnesium compound with an alcohol to form a magnesium dialkoxide compound; (ii) contacting said magnesium dialkoxide compound with a first agent to form a reaction product "A"; (iii) contacting said reaction product "A" with a second agent to form a reaction product "B"; (iv) contacting said reaction product "B" with a third agent to form a reaction product "C"; (v) contacting said reaction product "C" with a fourth agent to form a reaction product "D"; and (vi) contacting said reaction product "D" with a fifth agent to form said catalyst; and (B) extracting said polymer, wherein said first agent is selected from ClTi(O $^i$Pr)$_3$, ClSi(Me)$_3$, and combinations thereof; said second agent is TiCl$_4$/Ti(OBu)$_4$; said third agent is TiCl$_4$; said fourth agent is TiCl$_4$; said fifth agent is selected from TMA, TIBAl, TEAl n-octyl aluminum, n-hexyl aluminum, and combinations thereof and wherein said film has a thickness of 0.5 mil to 10 mil; a drop dart impact of 10 g to 200 g; a tear strength of 10 to 1200 g; and a machine direction secant modulus of 140,000 psi to 220,000 psi.

2. The film of claim 1, wherein said olefin is ethylene.

3. The film of claim 2, wherein said polymer is bimodal.

4. The film of claim 1, wherein said polymer has a melt flow index of from 0.25 dg/min to 0.75 dg/min.

5. The film of claim 1, wherein said polymer has a tensile strength of from 2000 to 6000 psi.

6. The film of claim 1, wherein said polymer has an elongation at break of from 50% to 400%.

7. The film of claim 1, wherein said polymer has a tear strength of from 10 g to 1200 g.

8. The film of claim 1, wherein said polymer has a drop dart impact strength of from 10 g to 200 g.

* * * * *